May 1, 1923.
H. T. SHEARER
1,453,643
REAMING TOOL FOR TRUING VALVE SEATS
Filed Jan. 10, 1922
2 Sheets-Sheet 1
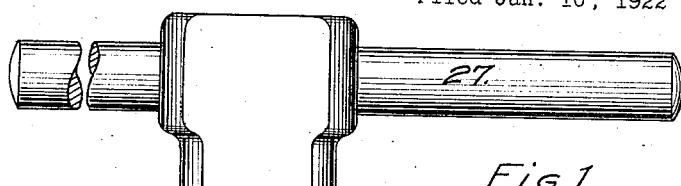
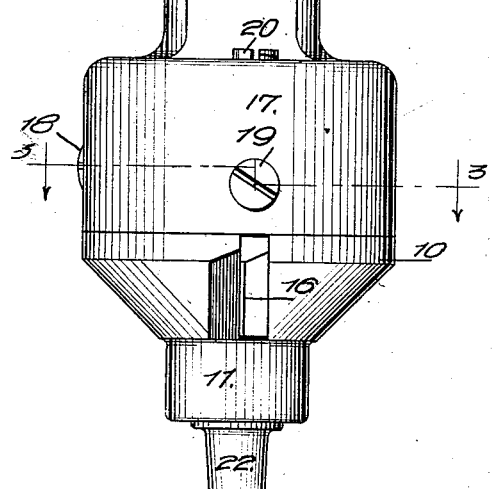
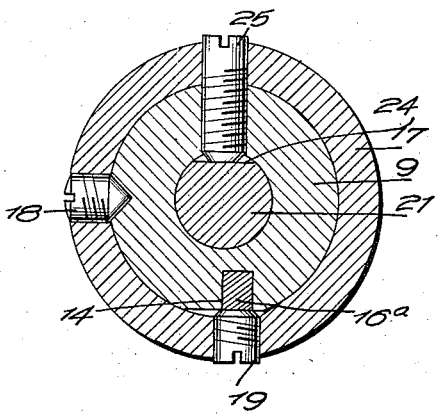
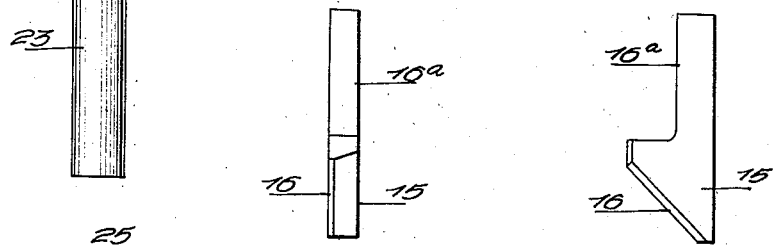
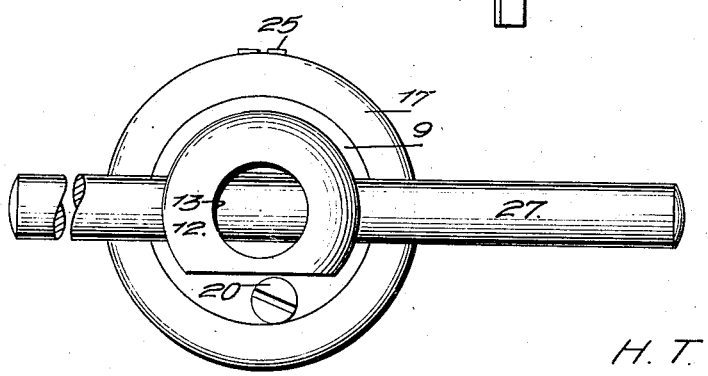
Inventor
H. T. Shearer,
By
Attorney May 1, 1923.
H. T. SHEARER
1,453,643
REAMING TOOL FOR TRUING VALVE SEATS
Filed Jan. 10, 1922 2 Sheets-Sheet 2
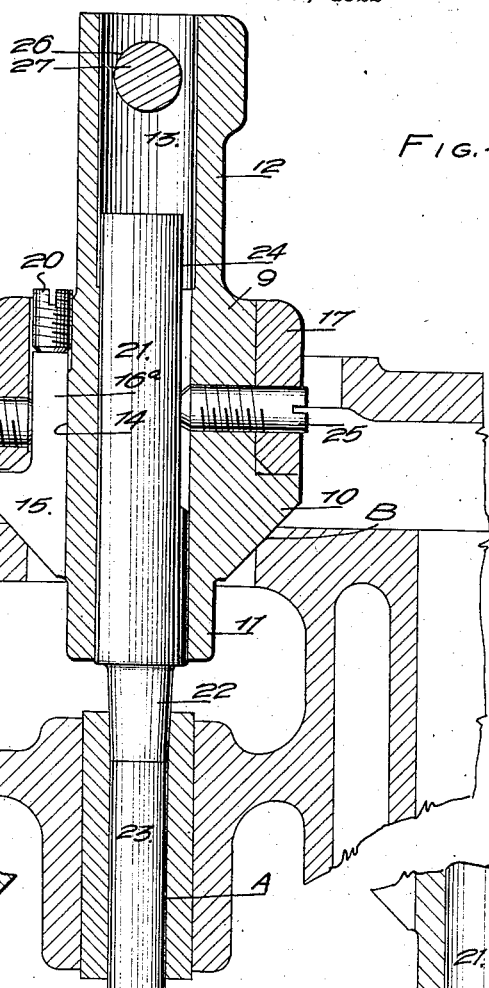
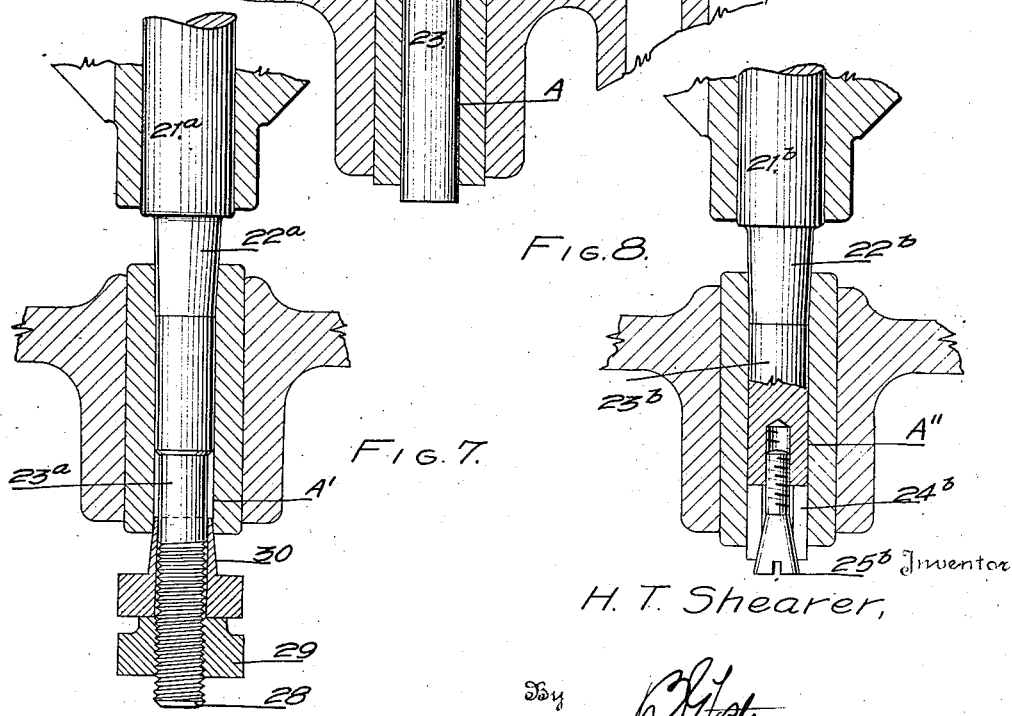
H. T. Shearer, Patented May 1, 1923.

1,453,643

UNITED STATES PATENT OFFICE.

HARRY T. SHEARER, OF WAYNESBORO, PENNSYLVANIA.

REAMING TOOL FOR TRUING VALVE SEATS.

Application filed January 10, 1922. Serial No. 528,152.

*To all whom it may concern:*

Be it known that I, HARRY T. SHEARER, a citizen of the United States, residing at Waynesboro, in the county of Franklin and State of Pennsylvania, have invented certain new and useful Improvements in Reaming Tools for Truing Valve Seats, of which the following is a specification.

The present invention relates more particularly to reaming tools for truing the valve seats of internal combustion engines, the object being to provide a tool of simple construction that can be properly guided and held in its operative position so that its reaming action will be very accurate.

A further and important object is to provide a tool, the parts of which may be readily adjusted to the particular seat being operated on, so that differences in formation due to wear may be taken care of.

In the accompanying drawings:

Figure 1 is a side elevation of the tool,

Figure 2 is a top plan view of the same,

Figure 3 is a cross sectional view on the line 3—3 of Figure 1,

Figure 4 is a longitudinal sectional view showing the tool in place in an engine, Figure 5 is an edge view of the cutting blade, Figure 6 is a side elevation of the blade, Figure 7 is a detail view of a slightly modified form of construction, Figure 8 is a similar view of another modification.

In the structure disclosed, a cutter head 9 is employed, having a lower tapered portion 10 terminating in a depending boss 11. This cutter head is also provided with an upstanding spindle 12, and extending axially through the head and spindle is a longitudinal bore 13. A seat is formed longitudinally in one side of the head, and consists of a slot 14 which, as illustrated in Figure 3, is preferably located at one side, but parallel to a diametrical plane of the head. This seat opens through the tapered bearing portion 10, and is adapted to receive a cutting blade. The blade consists of a body 15 having a beveled cutting edge 16 that corresponds substantially to the taper of the bearing portion 10. The body also has an upstanding shank 16$^a$. One or more blades may be employed. A collar 17 surrounds the cutter head and is held in place by a set screw 18. Threaded through this collar is a set screw 19 that bears against the shank 16$^a$ of the blade and constitutes holding means therefor. A vertically disposed screw 20, threaded into the cutter head, bears against the upper end of the shank and constitutes means for adjusting the blade, as well as an abutment therefor.

Slidably mounted in the bore 13 of the cutter head, is a pilot stem 21 that projects beyond the boss 11, and has a downwardly tapered portion 22 adjacent to said boss. The lower terminal portion 23 of the stem is preferably cylindrical and of the same diameter throughout. The portion of the stem within the bore has a flat face 24 against which a holding screw 25 is adapted to abut, said screw passing through the collar 17 and being threaded through the body 9. The spindle 12 is provided in its upper end with a transverse bore 26 in which is removably placed a cross bar 27.

The method of using the tool will be clear by reference to Figure 4. The pilot stem is adapted to enter the guide A of the valve stem and the bearing portion 10 of the cutter head is adapted to rest upon the valve seat B. As is well known the valve guide ordinarily wears at its upper end and the tapered portion 22 of the pilot stem will thus enter said valve guide and center the pilot and the cutter head with respect to the valve seat B. It will therefore be obvious that the pilot stem and arbor are adjustable so that they may be properly fitted to these parts, irrespective of the variation due to wear and the like. Having been properly applied the operator then rotates the tool by means of the cross handle 27 and the cutting blade will true the valve seat B.

It sometimes happens that the lower end of the valve stem guide A is also worn in taper form, in which case a pilot stem may be employed, provided with means for fitting into the lower end of the stem guide and providing a bearing that will center the lower end of the pilot stem. For example in Figure 7 there is illustrated a pilot stem, designated 21$^a$ having the upper tapered portion 22$^a$ and provided with the lower terminal portion 23$^a$. This portion is extended and threaded as shown at 28 to receive a nut 29 screwed thereupon. A cone 30, also located on the portion 23$^a$ above the nut, is adapted to enter the lower end of the valve stem guide A', and thus provide a bearing for the lower end of the pilot stem.

A modification of the above described structure is illustrated in Figure 8. In this case the pilot stem, designated 21ᵇ, is provided with the upper tapered portion 22ᵇ and the terminal portion 23ᵇ. The lower end of this terminal portion 23ᵇ is provided with a bore and is longitudinally slotted, as illustrated at 24ᵇ. In the bore is threaded a tapered plug 25ᵇ which when screwed inwardly will expand the lower end of the stem until it properly bears against the interior of the valve stem guide designated A".

From the foregoing, it is thought that the construction, operation and many advantages of the herein described invention, will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A tool of the character set forth, comprising a cutter head having a tapered bearing portion and a slot opening therethrough a cutting blade adjustably located in the slot having a cutting edge corresponding substantially to the face of the bearing portion, an adjusting screw in the head bearing against the end of the blade opposite to the cutting edge, and a set screw bearing laterally against the blade for clamping it against movement when adjusted.

2. A tool of the character set forth, comprising a cutter head having a seat, a cutter element in the seat, a collar surrounding the seat and blade, and means through the collar for clamping the blade.

3. A tool of the character set forth, comprising a cutter head having a seat, a cutter element in the seat, a collar surrounding the seat and blade, a pilot stem adjustably mounted in the cutter head, and means passing through the collar and head for holding the stem.

4. A tool of the character set forth, comprising a cutter head, a cutting blade mounted thereon, a pilot stem slidable axially in the cutter head and having a downwardly tapered portion adjacent to the head, means for relatively fixing the stem and head in adjusted relation, and means connected to the upper end of the head for rotating said head.

5. A tool of the character set forth, comprising a cutter head having a tapered bearing portion and a pilot stem adapted to enter the guide of the valve stem, said head having a socket opening through the tapered portion, a cutter blade located in said socket and having a cutting edge that corresponds substantially to the taper of the bearing portion, said blade having an upstanding shank, an adjusting screw bearing against the outer end of the shank, and a holding screw bearing against one side of the shank.

6. A tool of the character set forth, comprising a cutter head having a tapered bearing portion, a seat opening through said bearing portion, a depending pilot stem and an upstanding spindle, a cutting blade in the seat, a collar surrounding the head and blade, and a cross bar in the spindle for rotating the cutter head.

7. A tool of the character set forth, comprising a cutter head having a tapered bearing portion, a seat opening through said bearing portion, and an axial bore, a pilot stem slidable in the bore and projecting from the tapered end of the head, means for securing the stem in different positions in the bore, a cutting blade in the seat having a cutting edge corresponding to the taper of the bearing portion and having a shank, a collar surrounding the head and shank, means in the collar engaging the shank to hold the blade, and means connected to the upper end of the head for turning the same.

In testimony whereof, I affix my signature in the presence of two witnesses.

HARRY T. SHEARER.

Witnesses:
CHAS. G. WEBER,
GEO. H. RUSSELL.